United States Patent
Jung et al.

(10) Patent No.: US 10,468,143 B2
(45) Date of Patent: Nov. 5, 2019

(54) IN-VESSEL CONTROL ROD DRIVE MECHANISM AND NUCLEAR REACTOR WITH THE SAME

(71) Applicant: Korea Atomic Energy Research Institute, Daejeon (KR)

(72) Inventors: Seo Yoon Jung, Daejeon (KR); Young In Kim, Daejeon (KR); Jae Seon Lee, Daejeon (KR); Keung Koo Kim, Daejeon (KR); Tae Wan Kim, Daejeon (KR); Jong Wook Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1297 days.

(21) Appl. No.: 14/466,744

(22) Filed: Aug. 22, 2014

(65) Prior Publication Data
US 2015/0221399 A1    Aug. 6, 2015

(30) Foreign Application Priority Data

Aug. 23, 2013    (KR) .......................... 10-2013-0100582

(51) Int. Cl.
*G21C 7/14*    (2006.01)
*G21C 1/08*    (2006.01)
(Continued)

(52) U.S. Cl.
CPC ............... *G21C 7/12* (2013.01); *G21C 1/326* (2013.01); *G21C 3/326* (2013.01); *G21C 7/10* (2013.01); *G21D 3/04* (2013.01); *Y02E 30/39* (2013.01)

(58) Field of Classification Search
CPC .......... G21C 7/12; G21C 1/326; G21C 3/326; G21C 7/08
(Continued)

(56) References Cited

U.S. PATENT DOCUMENTS 3,676,296 A * 7/1972 Linning et al. ........ G21C 9/027
376/234
4,045,283 A * 8/1977 Noyes ...................... G21C 7/12
376/239
(Continued)

FOREIGN PATENT DOCUMENTS

| JP | 06174877 A | * 6/1994 |
| JP | 3162516 B2 | 2/2001 |
| JP | 2002-055189 A | 2/2002 |

OTHER PUBLICATIONS

Machine translation of JP 06174877.*
(Continued)

*Primary Examiner* — Jack W Keith
*Assistant Examiner* — John T Nolan
(74) *Attorney, Agent, or Firm* — Knobbe Martens Olson & Bear LLP

(57) ABSTRACT

Disclosed are an in-vessel control rod drive mechanism and a nuclear reactor with the same. The in-vessel control rod drive mechanism includes a control rod drive mechanism for regulating and a control rod drive mechanism for shutdown provided at an upper or lower space of a reactor core to insert or withdraw a regulating rod and a shutdown rod into/from the reactor core based on an operation state of the nuclear reactor, wherein the control rod drive mechanism for regulating and the control rod drive mechanism for shutdown are alternately arranged in the vertical direction. Therefore, a space of containment can be minimized due to the installation of the in-vessel control rod drive mechanism, and thus a rod ejection accident can be prevented, and a loss-of-coolant accident can be reduced.

4 Claims, 16 Drawing Sheets

(51) Int. Cl.
*G21C 7/12* (2006.01)
*G21C 1/32* (2006.01)
G21C 3/326 (2006.01)
G21C 7/10 (2006.01)
G21D 3/04 (2006.01)

(58) Field of Classification Search
USPC .......................................................... 376/219
See application file for complete search history.

(56) References Cited

U.S. PATENT DOCUMENTS

| | | | | |
|---|---|---|---|---|
| 4,484,093 A | * | 11/1984 | Smith ...................... | G21C 7/12 310/14 |
| 2011/0222640 A1 | * | 9/2011 | DeSantis .................. | G21C 7/14 376/229 |

OTHER PUBLICATIONS

Office action dated Sep. 15, 2014 of corresponding Korean Application No. 10-2013-0100582—4 pages.
Choi et al., "Control Rod Drive Mechanism Installed in the internal of Reactor Pressure Vessel", Technical Situation Analysis Report of Korea Atomic Energy Research Institute (KAER/AR-809/2008), Sep. 2008 in 57 pages.

* cited by examiner

IN-VESSEL CONTROL ROD DRIVE MECHANISM AND NUCLEAR REACTOR WITH THE SAME

CROSS-REFERENCE TO RELATED APPLICATION

This application claims priority to and the benefit of Korean Patent Application No. 10-2013-0100582, filed on Aug. 23, 2013, the disclosure of which is incorporated herein by reference in its entirety.

BACKGROUND

1. Field

The present disclosure relates to an in-vessel control rod drive mechanism and a nuclear reactor with the same, and more particularly, to an in-vessel control rod drive mechanism and a nuclear reactor with the same, in which a control rod drive mechanism letting a control rod regulate the reactivity of a reactor core is installed in a nuclear reactor.

2. Discussion of Related Art

According to installation positions of major components (e.g., a steam generator, a pressurizer, a reactor coolant pump, and so on), a nuclear reactor is classified into a loop type reactor (e.g., a conventional pressurized water reactor of Korea) where the major components are installed outside the reactor vessel, and an integral type reactor (e.g., a system-integrated modular advanced reactor (SMART)) where the major components are installed inside a reactor vessel.

And the nuclear reactor may be also classified into a pressurized water reactor in which boiling of a coolant is prevented, and a boiling water reactor in which the boiling of the coolant is allowed.

The nuclear reactor uses a control rod to control reactivity (a nuclear reaction, fission) of a reactor core. The control rod is operated by a control rod drive mechanism (CRDM).

One example of a control rod drive mechanism is disclosed in "Control rod drive mechanism installed in reactor pressure vessel", Technical Situation Analysis Report of Korea Atomic Energy Research Institute (KAERI) (KAERI/AR-809/2008) published in September, 2008.

SUMMARY

Meanwhile, if a CRDM is provided in a reactor vessel, the CRDM should be operated in a high temperature, high pressure, and highly-radioactive primary coolant. Therefore, it should be preceded by technical development of key components of the in-vessel control rod drive mechanism. Also in order to realize a boron-free reactor core, a miniaturization technology for the in-vessel control rod drive mechanism should be developed at the same time.

One aspect of the present invention is directed to an in-vessel control rod drive mechanism and a nuclear reactor with the same, in which a control rod drive mechanism is alternately arranged at an upper or lower side of a reactor core and installed inside the nuclear reactor.

Another aspect of the present invention is also directed to an in-vessel control rod drive mechanism and a nuclear reactor with the same, in which a difficulty in miniaturizing the in-vessel control rod drive mechanism may be relieved by the alternate arrangement, and a boron-free reactor core may be also easily realized.

One aspect of the present invention provides an in-vessel control rod drive mechanism including a control rod drive mechanism for regulating and a control rod drive mechanism for shutdown provided at an upper or lower space of a reactor core to insert or withdraw a regulating rod and a shutdown rod into/from the reactor core based on an operation state of a nuclear reactor, wherein the control rod drive mechanism for regulating and the control rod drive mechanism for shutdown are alternately arranged.

Another aspect of the present invention provides a nuclear reactor including an in-vessel control rod drive mechanism according to the present invention, which is provided inside a pressure vessel of the reactor, and inserts or withdraws a regulating rod and a shutdown rod into/from a reactor core based on an operation state of the nuclear reactor.

According to the nuclear reactor with the in-vessel control rod drive mechanism as described above, the control rod drive mechanism for regulating and the control rod drive mechanism for shutdown can be divided and alternately arranged at the upper and lower sides of the reactor core, can be divided and alternately arranged at the upper side of the reactor core, or can be divided and alternately arranged at the lower side of the reactor core.

Therefore, according to embodiments of the present invention, the control rod drive mechanism for regulating and the control rod drive mechanism for shutdown can be respectively installed to have a different structure from each other. Even when a width or a diameter of the control rod drive mechanism is greater than a width of the fuel assembly, a plurality of control rod drive mechanisms can be installed and it is possible to accommodate more CRDMs than internal CRDMs of convention arrange. The control rod drive mechanism for regulating and the control rod drive mechanism for shutdown can be easily arranged without the significant obstruction of flow through the reactor core. The upper structure of the reactor core and the penetrating structure of the pressure vessel can be simplified, and the fluid passage resistance of the nuclear reactor cooling system can be reduced.

According to embodiments of the present invention, the plurality of control rod drive mechanisms can be installed, and thus a sufficient reactor core shutdown margin can be provided.

According to embodiments of the present invention, when the control rod drive mechanism for shutdown is provided at the lower side of the reactor core, the lower portion of the shutdown rod can be used as the burnable poison rod, and thus the boron-free reactor core can be easily realizable.

According to embodiments of the present invention, it is possible to accommodate more CRDMs than internal CRDMs of convention arrange, and the rod worth per each control rod drive mechanism can be reduced, and thus an influence of the malfunction of the control rod can be minimized.

According to embodiments of the present invention, a space of containment can be minimized due to the installation of the in-vessel control rod drive mechanism, and thus the rod ejection accident can be prevented, and the loss-of-coolant accident can be reduced.

BRIEF DESCRIPTION OF THE DRAWINGS

The above and other aspects, features, and advantages of the present invention will become more apparent to those of ordinary skill in the art by describing in detail embodiments thereof with reference to the accompanying drawings, in which.

DETAILED DESCRIPTION OF EMBODIMENTS

Figure 1:
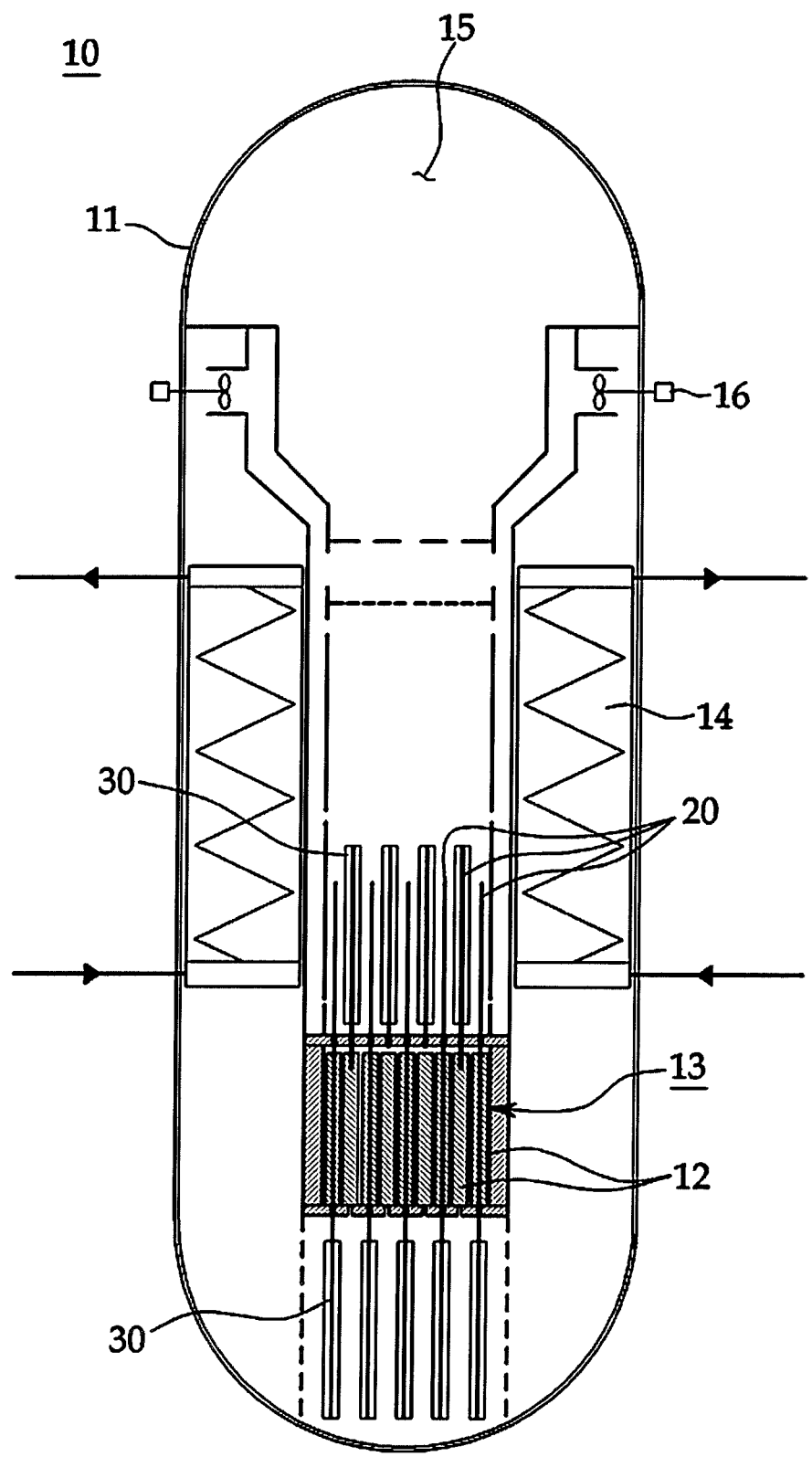
FIG. 1 is a configuration view of a nuclear reactor with an in-vessel control rod drive mechanism according to a first embodiment of the present invention.

Hereinafter, an in-vessel control rod drive mechanism and a nuclear reactor with the same according to the embodiment of the present invention will be described in detail with reference to accompanying drawings.

In the present disclosure, although in the singular number, a noun is construed as in the plural number, except as distinctively expressed in context.

Generally, the CRDM which is applied to the nuclear reactor is installed outside the reactor vessel. That is, a top-inserted CRDM which is installed at a top of the nuclear reactor is used in a pressurized water reactor, and a bottom-inserted CRDM which is installed at a bottom of the nuclear reactor is used in a boiling water reactor.

An external CRDM installed outside the reactor vessel is installed at a nozzle passing through the reactor vessel, and thus the CRDM forms part of a reactor pressure boundary together with a nozzle.

Therefore, there is a possibility that the external CRDM may be damaged, and thus there is a risk that a loss-of-coolant accident or a rod ejection accident may occur.

For addressing the foregoing possibility, an in-vessel CRDM is provided. The in-vessel CRDM is capable of fundamentally excluding the accidents and improving safety of a nuclear power plant, installing a plurality of control rods to realize a boron-free reactor core and to minimize related equipment thereof, and installing the CRDM inside the reactor vessel in an effort to simplify a reactor vessel penetration design and to reduce an amount of radioactive waste, have been developed.

An in-vessel control rod drive mechanism according to embodiments of the present invention is arranged inside a nuclear reactor to prevent a rod ejection accident, to easily realize a boron-free reactor core, to enhance use of a space at an upper or lower side of a reactor vessel, and to miniaturize a containment.

In particular, the in-vessel control rod drive mechanism according to embodiments of the present invention may be divided into upper and lower portions and alternately arranged at upper and lower sides of the reactor core, may be divided into upper and lower portions and alternately arranged at the upper side of the reactor core, or may be divided into upper and lower portions and alternately arranged at the lower side of the reactor core.

As described above, even when a width or a diameter of the in-vessel control rod drive mechanism according to embodiments of the present invention is greater than a width of a fuel assembly, the in-vessel control rod drive mechanism may be disposed at each fuel assembly to sufficiently secure a means for restricting reactivity of the reactor core, and thus stability of the nuclear reactor may be enhanced, and the boron-free reactor core may be easily realized.

Embodiments of the present invention may allow a primary coolant to flow with small resistance at the upper or lower side of the reactor core, may relieve a difficulty of flow uniformity at the reactor core, and thus may solve a problem that the fluid flow at the upper or lower side of the reactor core is disturbed by the control rod drive mechanism and a fluid passage resistance is increased.

Hereinafter, the nuclear reactor with the in-vessel control rod drive mechanism according to embodiments of the present invention will be described fully.

[First Embodiment]

Figure 2:
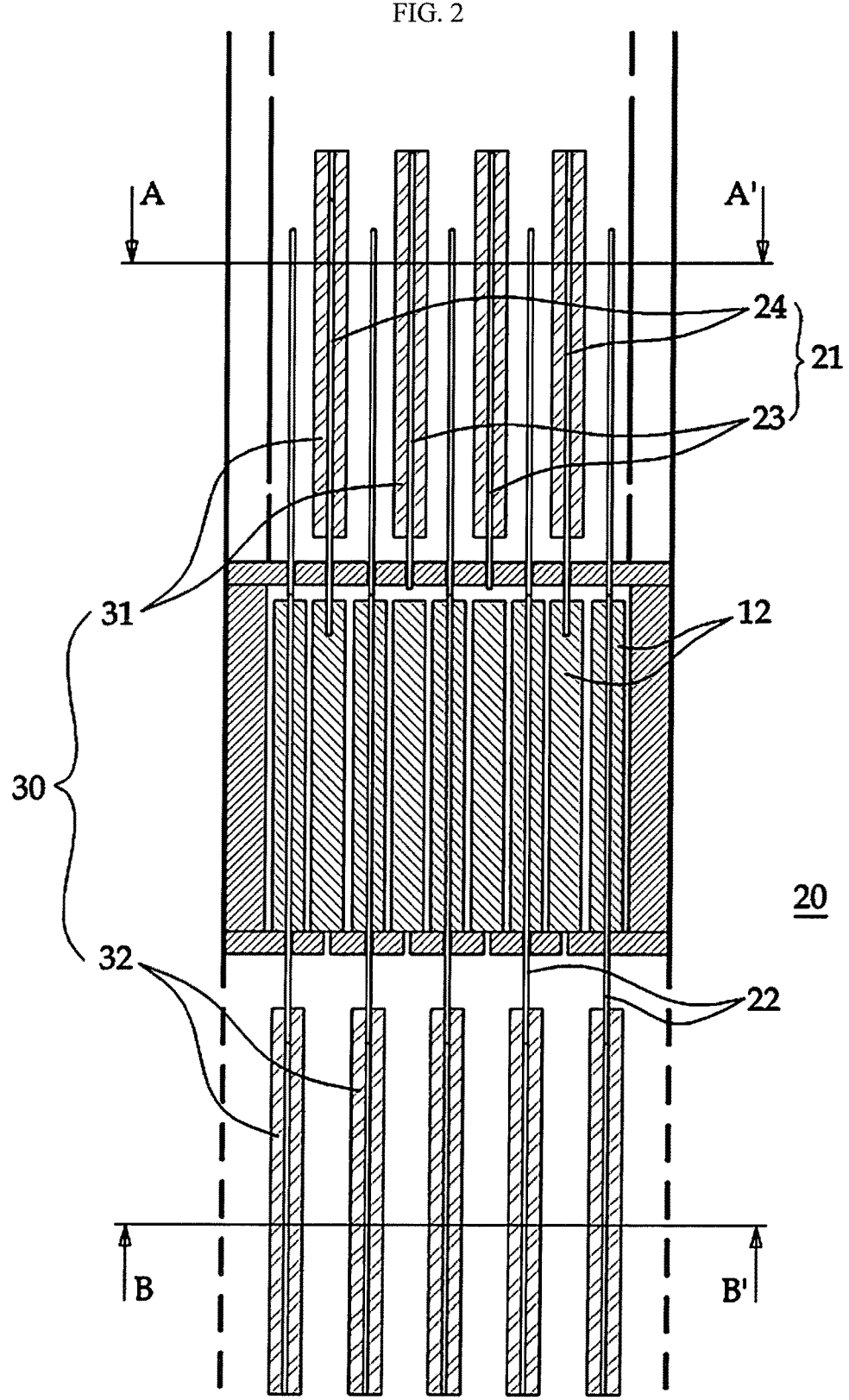
FIG. 2 is a partially enlarged view of the reactor illustrated in FIG. 1.

FIG. 1 is a configuration view of a nuclear reactor with an in-vessel control rod drive mechanism according to a first embodiment of the present invention, and FIG. 2 is a partially enlarged view of the reactor illustrated in FIG. 1.

For convenience of explanation in the embodiment, an integral type reactor (hereinafter, called as a "reactor") will be used.

However, the present invention is not always limited thereto.

That is, embodiments of the present invention may be applied to a loop type reactor as well as the integral type reactor.

As illustrated in FIG. 1, the nuclear reactor 10 may include a pressure vessel 11, a fuel assembly 13 installed inside the pressure vessel 11 and having therein a reactor core 12 generating heat energy using a nuclear reaction of a nuclear fuel, a control rod 20 regulating reactivity of the reactor core 12, a steam generators 14 configured to transfer the heat energy generated from the reactor core 12 to a secondary coolant and thus to generate steam, a pressurizer 15 configured to control a pressure of a primary cooling system of the nuclear reactor 10, and a reactor coolant pump 16 configured to circulate a primary coolant.

Of course, in the case of the loop type reactor, the steam generator 14, the pressurizer 15, and the reactor coolant pump 16 may be disposed outside the pressure vessel 11.

Figure 3:
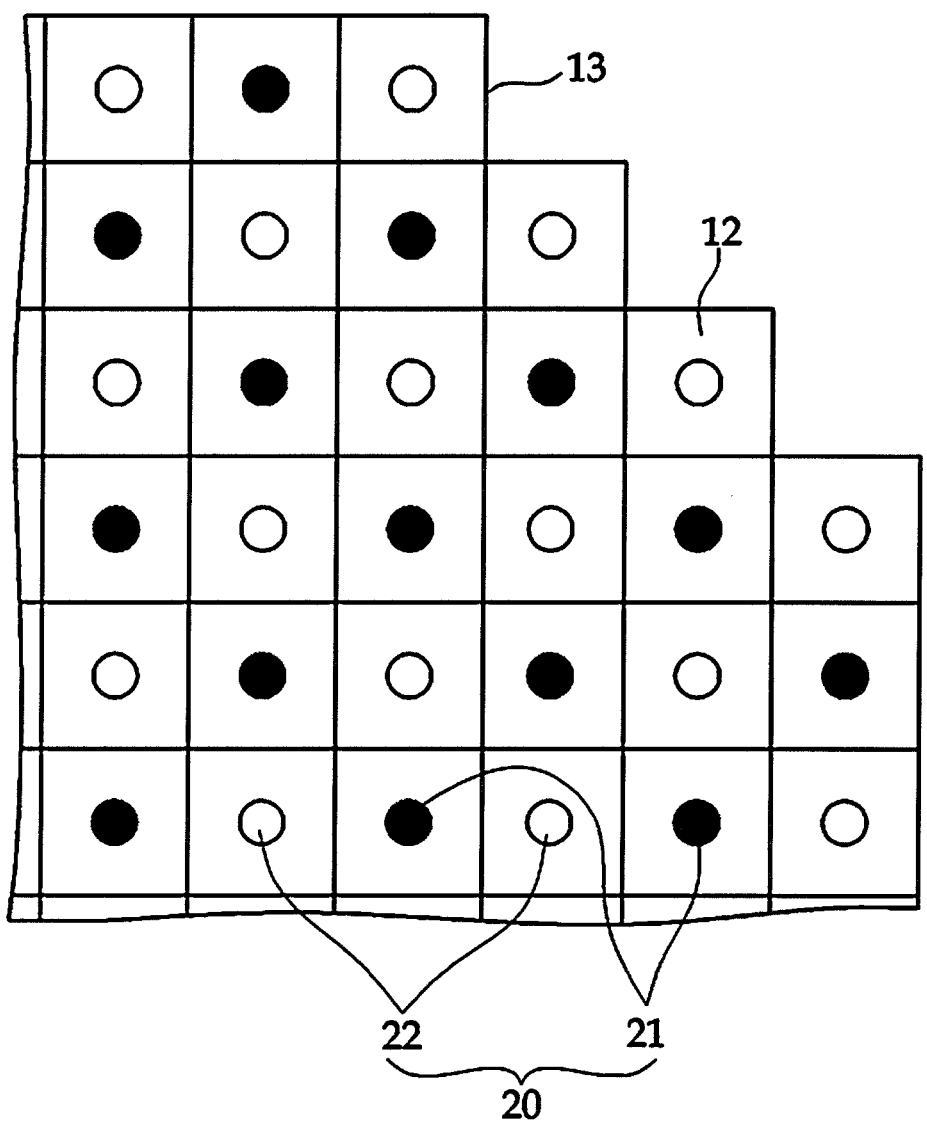
FIG. 3 is a partially enlarged cross-sectional view of a reactor core and a control rod illustrated in FIG. 2.
Figure 4:
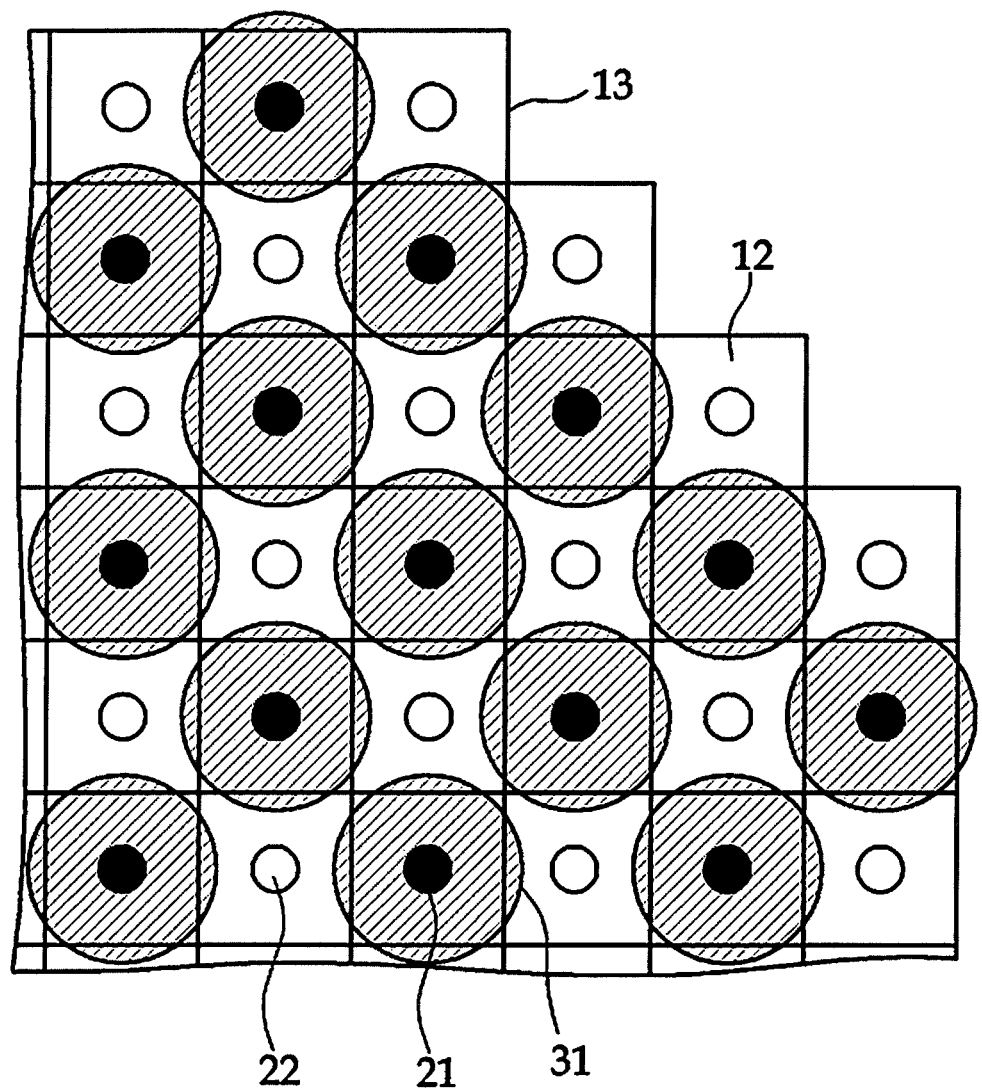
FIG. 4 is a cross-sectional view taken along line A-A' of FIG. 2.
Figure 5:
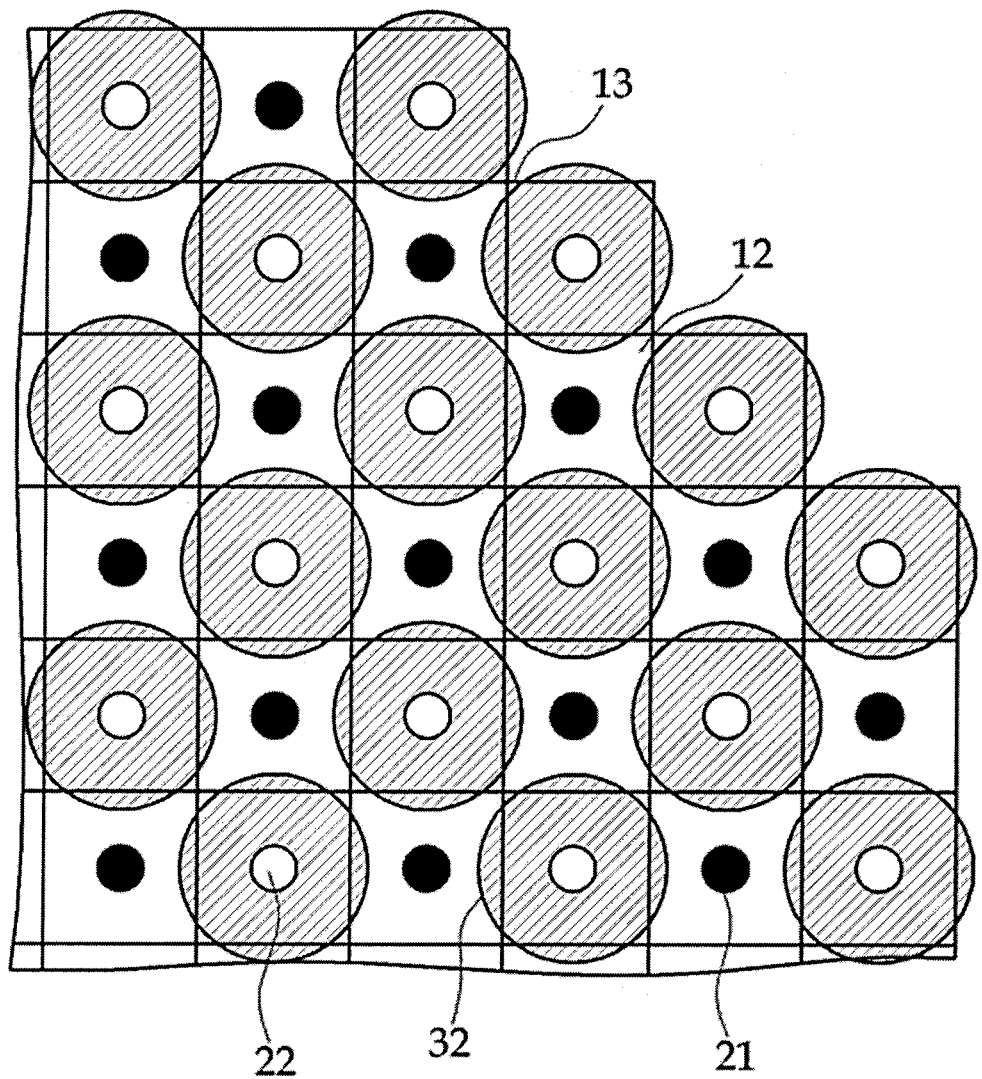
FIG. 5 is a cross-sectional view taken along line B-B' of FIG. 2.

FIG. 3 is a partially enlarged cross-sectional view of the reactor core and the control rod illustrated in FIG. 2, FIG. 4 is a cross-sectional view taken along line A-A' of FIG. 2, and FIG. 5 is a cross-sectional view taken along line B-B' of FIG. 2.

As illustrated in FIGS. 2 and 3, the control rod 20 is classified into a regulating rod 21 which regulates the degree of insertion when the nuclear reactor 10 is in startup or normal operation mode, and regulates the reactivity of the reactor core 12, and a shutdown rod 22 which inserts negative reactivity when the nuclear reactor 10 is in shutdown mode, and shutdowns the nuclear reactor 10.

FIG. 3 shows that the control rod 20 is installed at all of the fuel assembly 13. However, the present invention is not limited thereto, and the control rod 20 may not be installed at part of the fuel assembly 13 according to characteristics required in the nuclear reactor.

The regulating rod 21 may include a control rod for startup 23 and a control rod for normal operation 24.

The control rod for startup 23 may perform a function of compensating a change in the reactivity between a zero power mode with high temperature and a full power mode with high temperature, and the control rod for normal operation 24 may perform a function of compensating a change in a degree of fuel burn-up according to the elapse of operation time.

The shutdown rod 22 may compensate the change in the reactivity between a zero power mode with low temperature and the zero power mode with high temperature.

Meanwhile, when it is necessary to urgently shutdown the nuclear reactor 10, power is shut off, and the regulating rod 21 and the shutdown rod 22 are urgently inserted into the reactor core 12 by force of gravity, force of pressure, force of a spring, or the like, and perform a function of shutting down the nuclear reactor 10.

Generally, in the integral type reactor, it is easy to provide an available space for installing a control rod drive mechanism 30 at upper and lower sides of the reactor core 12.

Therefore, in the embodiment, as illustrated in FIG. 2, the in-vessel control rod drive mechanism 30 is alternately arranged at the upper and lower sides of the reactor core 12.

More specifically, as illustrated in FIGS. 4 and 5, the in-vessel control rod drive mechanism 30 according to the first embodiment of the present invention may include a control rod drive mechanism for regulating 31 provided at the upper side of the reactor core 12 and configured to insert or withdraw the regulating rod 21 into/from the reactor core 12 according to an operation state of the nuclear reactor 10, and a control rod drive mechanism for shutdown 32 provided at the lower side of the reactor core 12 and configured to insert or withdraw the shutdown rod 22 into/from the reactor core 12 according to the operation state of the nuclear reactor 10.

As described above, embodiments of the present invention may install the control rod drive mechanism for regulating 31 and the control rod drive mechanism for shutdown 32 at the upper and lower sides of the reactor core 12 without significant obstruction of flow through the reactor core 12.

The control rod drive mechanism for shutdown 32 may be fabricated to have a relatively simple structure, compared with the control rod drive mechanism for regulating 31 in which precise control is required.

Therefore, in the embodiment, the control rod drive mechanism for shutdown 32 is installed at the lower side of the reactor core 12.

As the control rod drive mechanism for shutdown 32 is installed at the lower side of the reactor core 12, a lower portion of the shutdown rod 22 may be used as a burnable poison rod, and thus a boron-free reactor core may be easily realizable.

Figure 6:
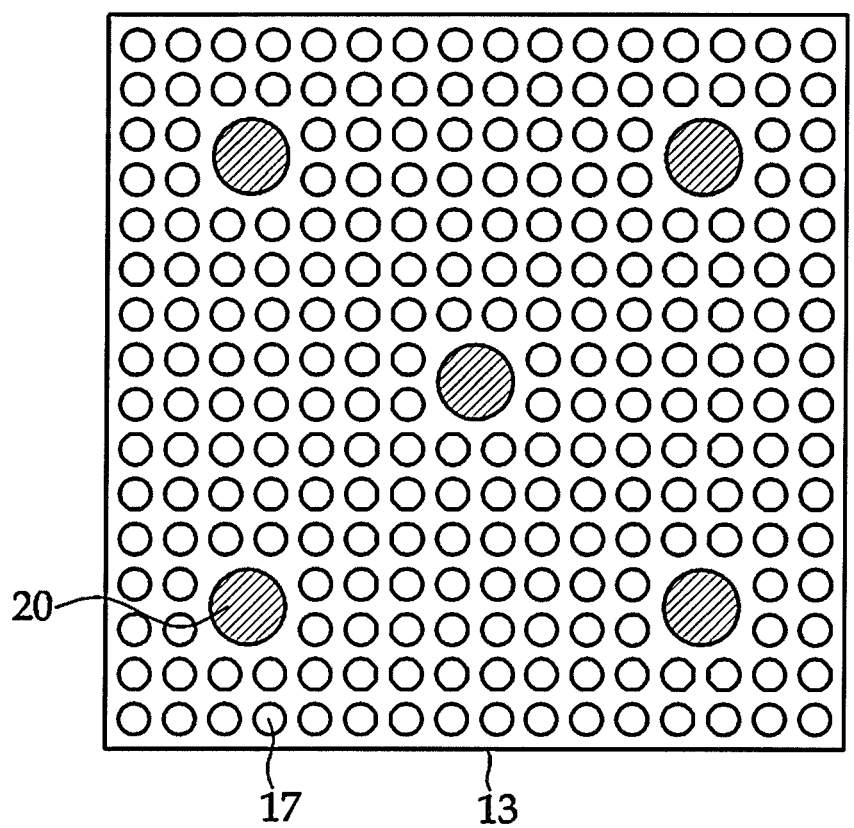
FIGS. 6 to 8 are views illustrating installation states of a fuel assembly and the control rod.
Figure 7:
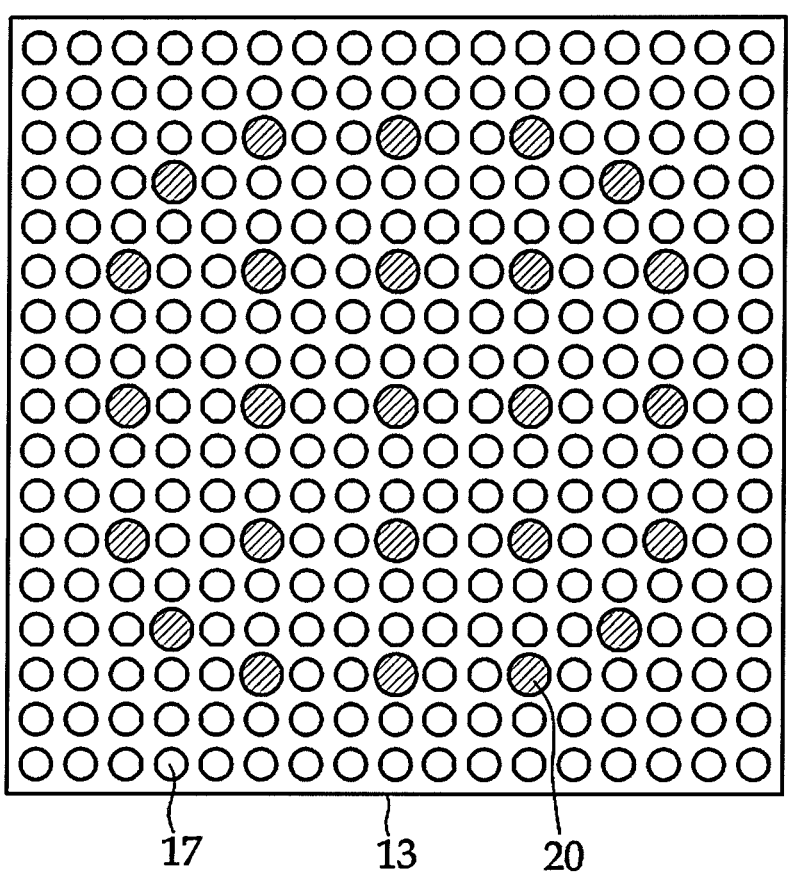
Figure 8:
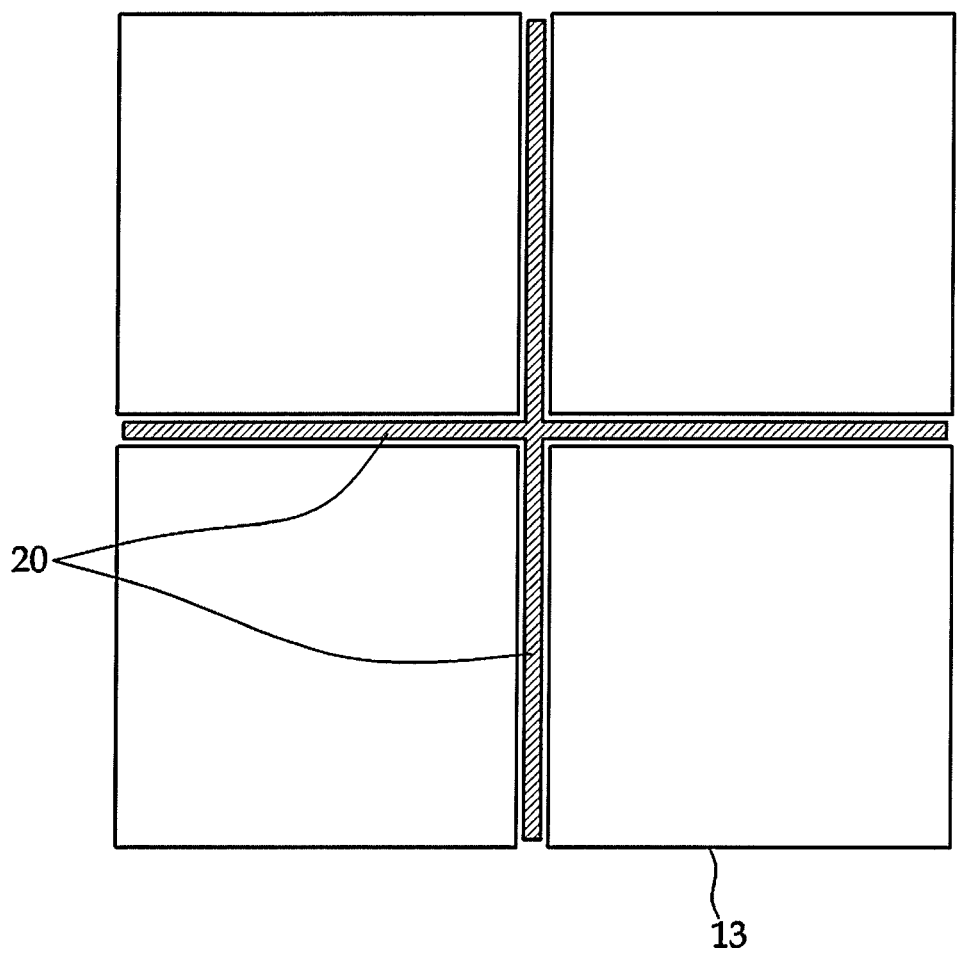

Meanwhile, FIGS. 6 to 8 are views illustrating installation states of the nuclear fuel assembly and the control rod.

As illustrated in FIG. 6, the control rod 20 may be fabricated to have a larger diameter than that of a fuel rod 17 arranged in the fuel assembly 13, and then installed to be spaced a predetermined distance.

Alternatively, as illustrated in FIG. 7, the control rod 20 may be fabricated to have a similar diameter to that of the fuel rod 17 arranged in the fuel assembly 13, and then installed so that all of the control rods 20 form a certain shape.

Or, as illustrated in FIG. 8, the control rod 20 may have an approximately '+'-shaped cross section, and may be installed among the fuel assembly 13 having an approximately rectangular plate-shaped cross section.

As described above, embodiments of the present invention may change a position of the control rod according to standards and shapes of the fuel assembly, the fuel rod, and the control rod, and may effectively install the control rod.

Next, an operation method of the nuclear reactor with the in-vessel control rod drive mechanism according to the embodiment of the present invention will be described in detail with reference to FIGS. 9 to 14.

Figure 9:
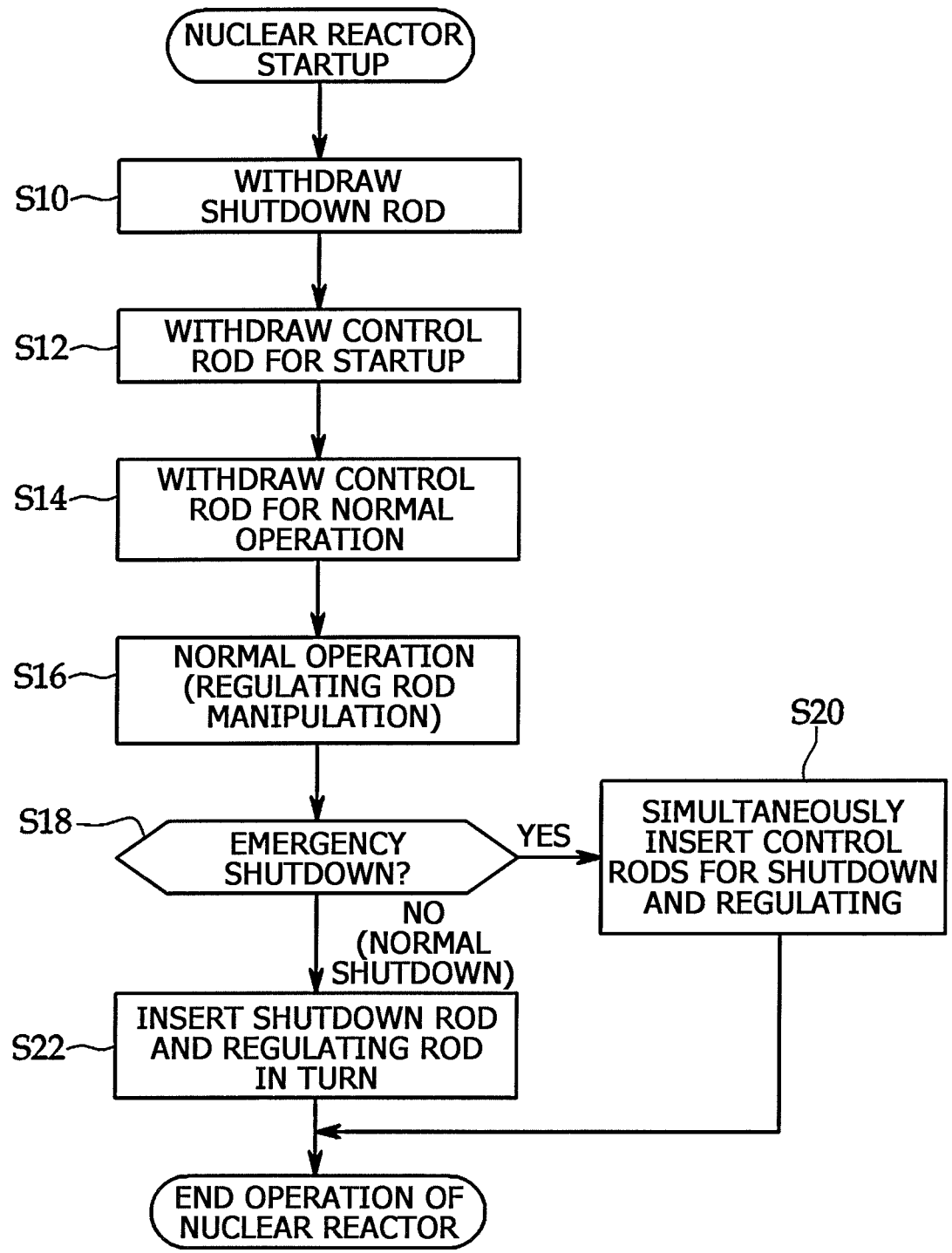
FIG. 9 is a flowchart illustrating each process in an operation method of the nuclear reactor with the in-vessel control rod drive mechanism according to the embodiment of the present invention.

FIG. 9 is a flowchart illustrating each process in the operation method of the nuclear reactor with the in-vessel control rod drive mechanism according to the embodiment of the present invention, and FIGS. 10 to 13 are views illustrating operation states according to the operation method of the nuclear reactor with the in-vessel control rod drive mechanism illustrated in FIG. 9.

In FIG. 9, when the nuclear reactor 10 is in startup mode, the nuclear reactor 10 and a related system are preheated to be operated in normal operation mode, and the in-vessel control rod drive mechanism 30 withdraws the control rods for shutdown, startup, and normal operation 22, 23, and 24, in turn, from the reactor core 12, and startups the reactor core 12.

Figure 10:
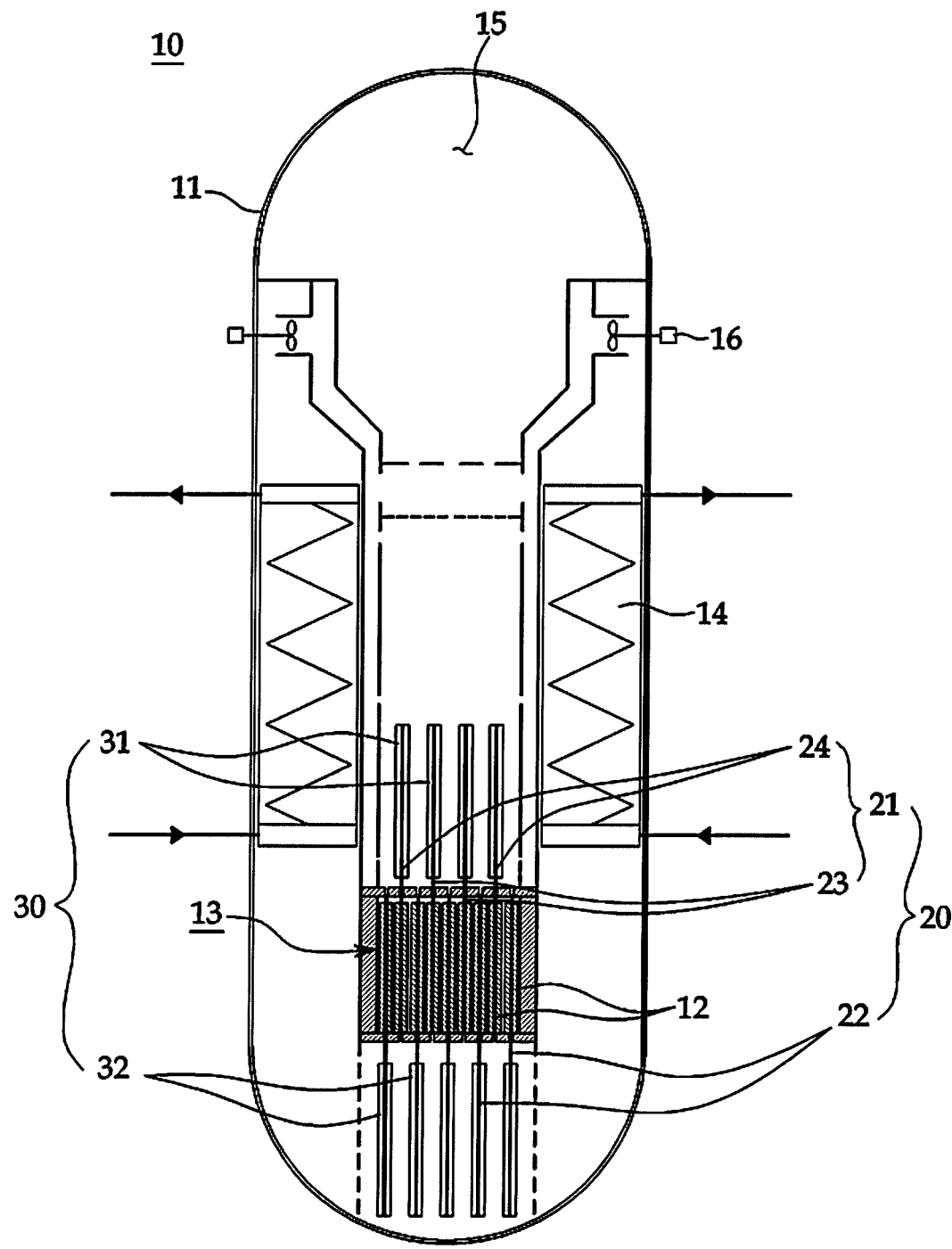
FIGS. 10 to 13 are views illustrating operation states according to the operation method of the nuclear reactor with the in-vessel control rod drive mechanism illustrated in FIG. 9.

As illustrated in FIG. 10, all of the control rods for shutdown, startup, and normal operation 22, 23, and 24 are inserted into the reactor core 12 before starting up the nuclear reactor 10.

Figure 11:
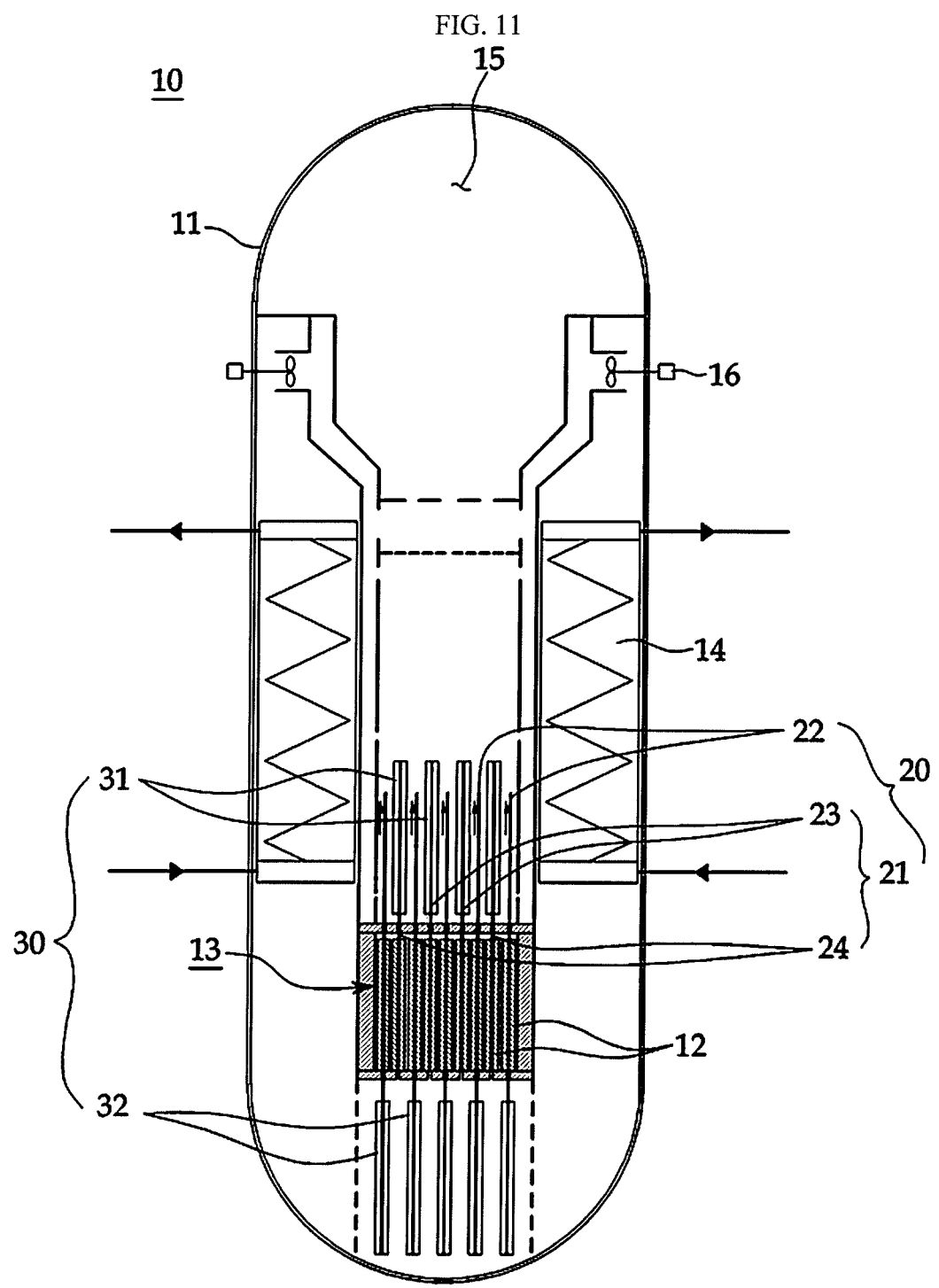

In a process S10 of startup processes of the nuclear reactor 10, as illustrated in FIG. 11, the control rod drive mechanism for shutdown 32 connected to the shutdown rod 22 withdraws the shutdown rod 22 from the reactor core 12.

At this time, the control rod drive mechanism for shutdown 32 may be operated to withdraw the shutdown rod 22 to the upper side of the reactor core 12 using driving force of a motor, force of pressure, force of gravity, or restored force of a spring.

Of course, the control rod drive mechanism for shutdown 32 may be operated to withdraw the shutdown rod 22 to the lower side of the reactor core 12.

Figure 12:
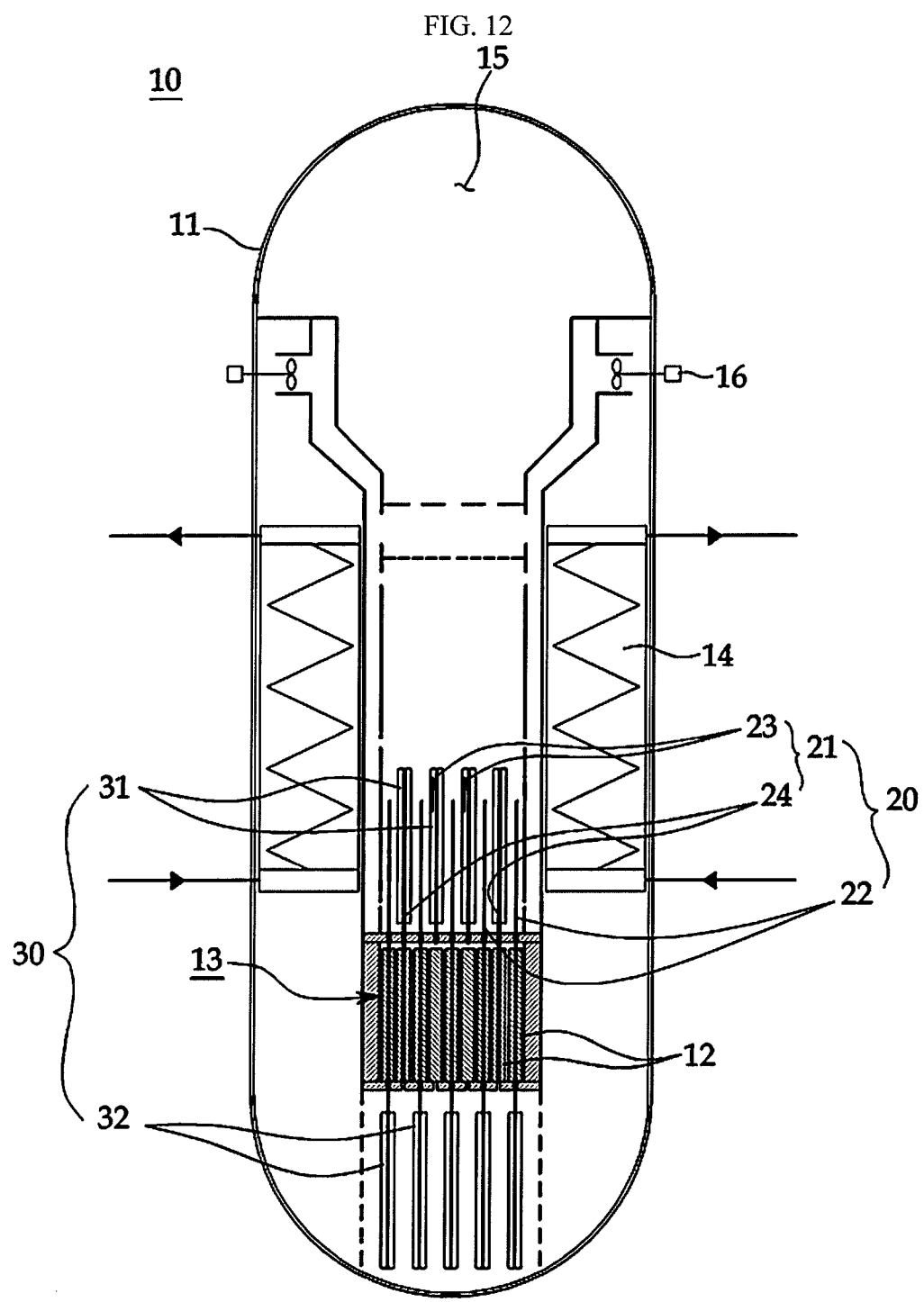

In a process S12, as illustrated in FIG. 12, the control rod drive mechanism for regulating 31 connected to the control rod for startup 23 withdraws the control rod for startup 23 from the reactor core 12.

At this time, the control rod drive mechanism for regulating 31 may be operated to withdraw the control rod for startup 23 to the upper side of the reactor core 12 using the driving force of the motor, force of pressure, the force of gravity, or the restored force of the spring.

Figure 13:
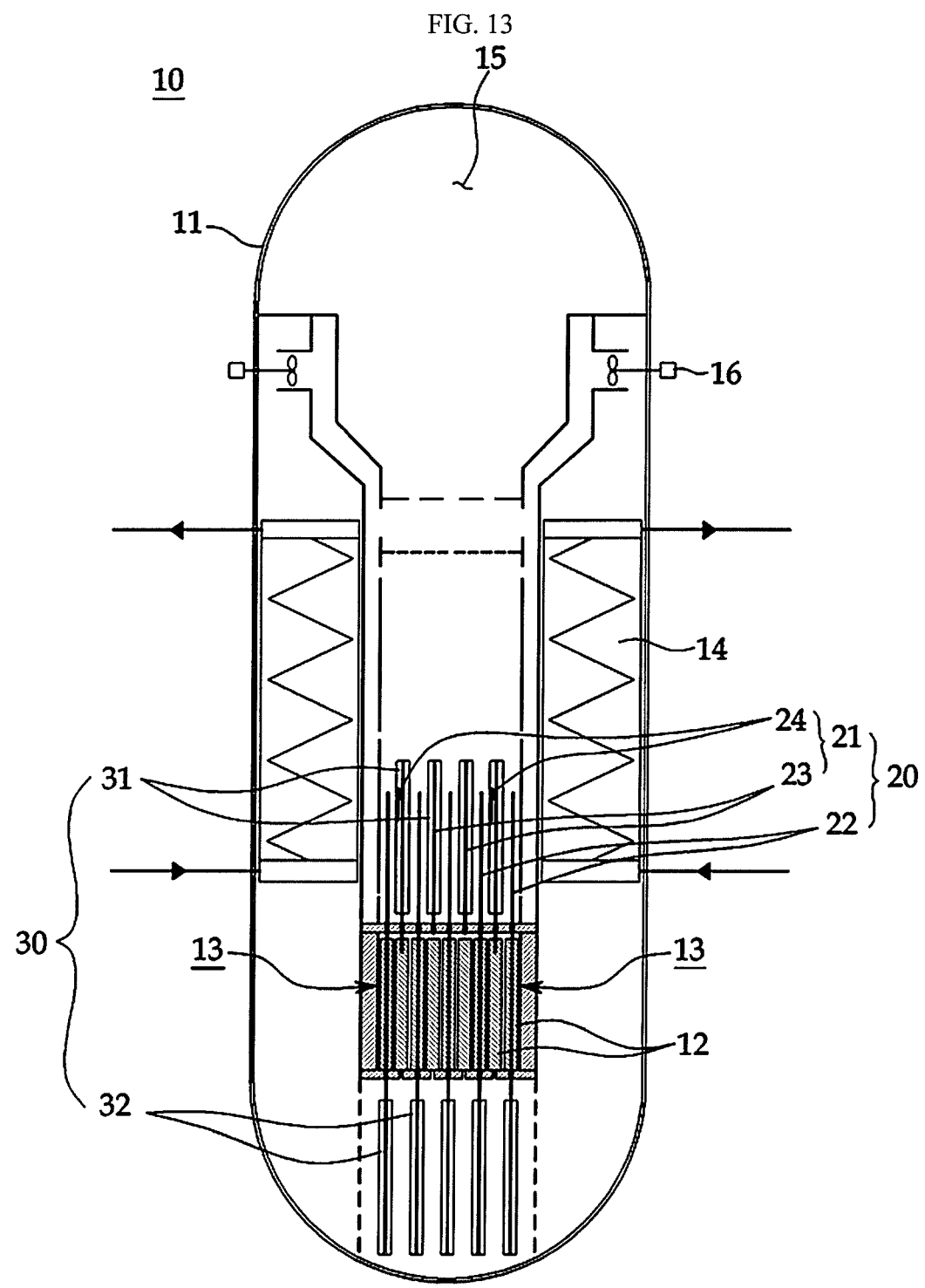

In a process S14, as illustrated in FIG. 13, the control rod drive mechanism for regulating 31 connected to the control rod for normal operation 24 withdraws the control rod for normal operation 24 from the reactor core 12.

At this time, the control rod drive mechanism for regulating 31 may be operated to withdraw the control rod for normal operation 24 to the upper side of the reactor core 12 using the driving force of the motor, the force of pressure, the force of gravity, or the restored force of the spring.

Meanwhile, in the process S12 of withdrawing the control rod for startup 23 and the process S14 of withdrawing the control rod for normal operation 24, the control rod for normal operation 24 is not always withdrawn after the control rod for startup 23 is withdrawn. Embodiments of the present invention may be modified such that the control rod for startup 23 and the control rod for normal operation 24 are alternately withdrawn according to the characteristics required in the nuclear reactor.

If the control rods for shutdown, startup, and normal operation 22, 23, and 24 are withdrawn in turn through the processes S10 to S14, the reactor core 12 startups, and the nuclear reactor 10 moves to normal operation mode (S16).

At this time, the control rod drive mechanism for regulating 31 may control the degree of insertion of the control rods for startup and normal operation 23 and 24, and thus may regulate the reactivity of the reactor core 12.

Therefore, the heat energy is generated in the reactor core 12 due to the nuclear reaction of the nuclear fuel, and it is transferred to the steam generator 14. The steam generators 14 convert the secondary coolant to steam with the transferred energy, and then supply the steam to a turbine (not shown).

Meanwhile, when the operation of the nuclear reactor 10 is ended, the control rods for shutdown, startup, and normal operation 22, 23, and 24 may be controlled to be inserted into the reactor core 12, such that the nuclear reactor 10 is shutdown.

Specifically, in the case of abnormal occurrence during the operation of the nuclear reactor 10, if an emergency shutdown command is transferred from a control part (not shown) configured to control the operation of the nuclear reactor 10 in a process S18, the control rod drive mechanism for shutdown 32 and the control rod drive mechanism for regulating 31 are operated to simultaneously insert the regulating and shutdown rods 21 and 22 into the reactor core 12.

At this time, the control rod drive mechanism for shutdown 32 and the control rod drive mechanism for regulating 31 may be operated to move the control rods for shutdown, startup, and normal operation 22, 23, and 24 and to insert them into the reactor core 12 using the driving force of the motor, the force of pressure, the force of gravity, or the restored force of the spring.

However, in the process S18, when the operation of the nuclear reactor 10 is ended in a normal operating state, the control rod drive mechanism for shutdown 32 and the control rod drive mechanism for regulating 31 are respectively operated to insert the shutdown rod 22 and the control rods for startup and normal operation 23 and 24 into the reactor core 12 according to an operating signal of an operator.

If the operation of the nuclear reactor 10 is ended through a process S20 or S22, the control rod drive mechanism for shutdown 32 and the control rod drive mechanism for regulating 31 is on standby until a restart of the nuclear reactor 10 in a state in which the shutdown rod 22 and the control rods for startup and normal operation 23 and 24 are inserted again into the reactor core 12, as illustrated in FIG. 10.

Through the processes as described above, embodiments of the present invention may install the control rod drive mechanism at the upper or lower space of the reactor core to be disposed in the nuclear reactor, and thus may fundamentally exclude a loss-of-coolant accident or a rod ejection accident due to a damage of an external control rod drive mechanism according to the related art. Therefore, the safety of a nuclear power plant may be enhanced.

Meanwhile, the embodiment has been disclosed wherein the control rod drive mechanism for regulating and the control rod drive mechanism for shutdown are respectively provided at the upper and lower sides of the reactor core. However, the present invention is not limited thereto.

That is, in embodiments of the present invention, the control rod drive mechanism for shutdown may be provided at the upper side of the reactor core, and the control rod drive mechanism for regulating may be provided at the lower side of the reactor core. Alternatively, the control rod drive mechanism for shutdown and the control rod drive mechanism for regulating may be provided at the upper side of the reactor core.

[Second Embodiment]

Figure 14:
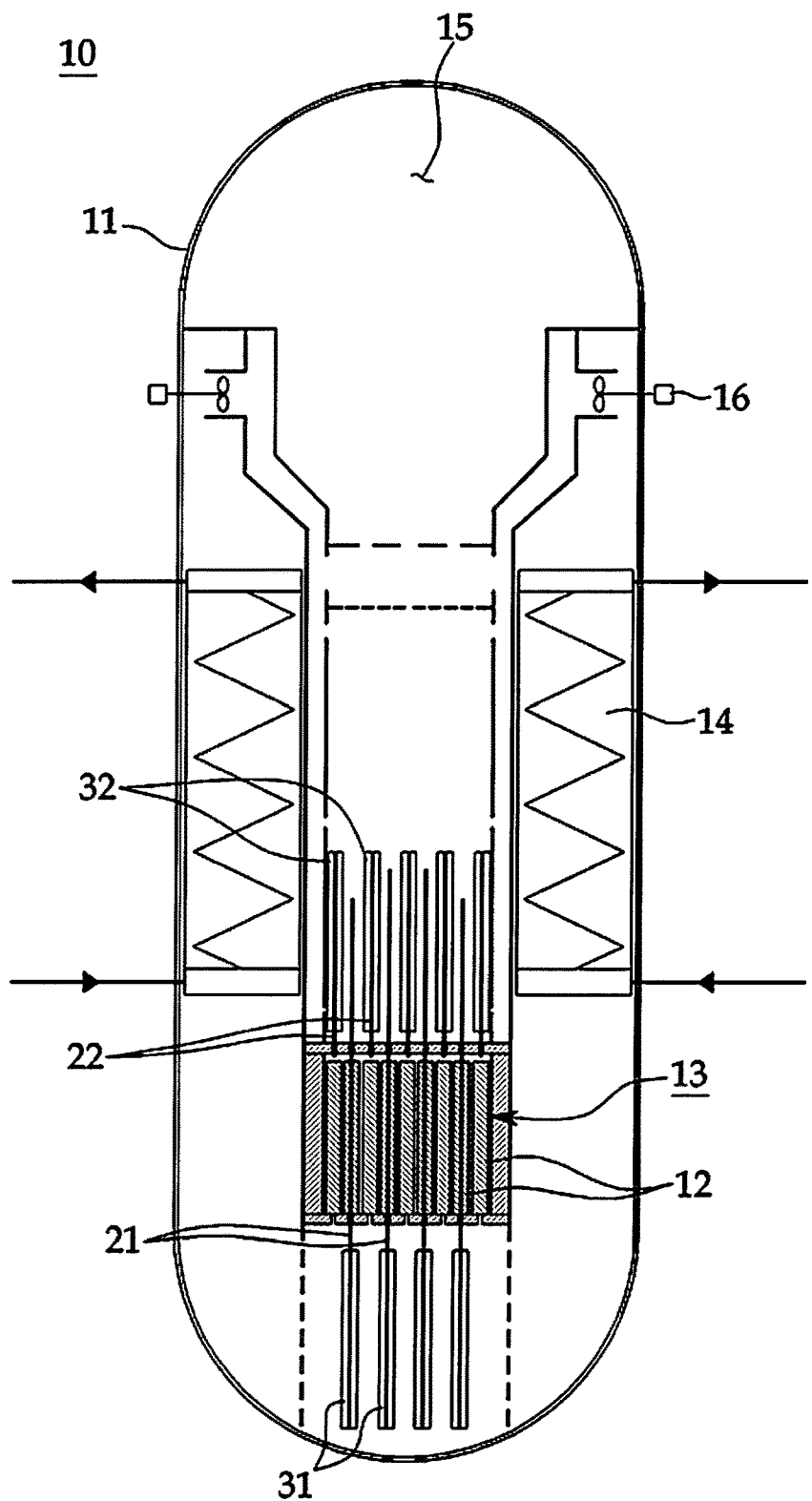
FIG. 14 is a configuration view of a nuclear reactor with an in-vessel control rod drive mechanism according to a second embodiment of the present invention.

FIG. 14 is a configuration view of a nuclear reactor with an in-vessel control rod drive mechanism according to a second embodiment of the present invention.

As illustrated in FIG. 14, in the in-vessel control rod drive mechanism according to the second embodiment of the present invention, the control rod drive mechanism for regulating 31 may be provided at the lower side of the reactor core 12 to insert or withdraw the regulating rod 21 into/from the reactor core 12 according to an operation state of the nuclear reactor 10.

The control rod drive mechanism for shutdown 32 may be provided at the upper side of the reactor core 12 to insert or withdraw the shutdown rod 22 into/from the reactor core 12 according to the operation state of the nuclear reactor 10.

[Third Embodiment]

Figure 15:
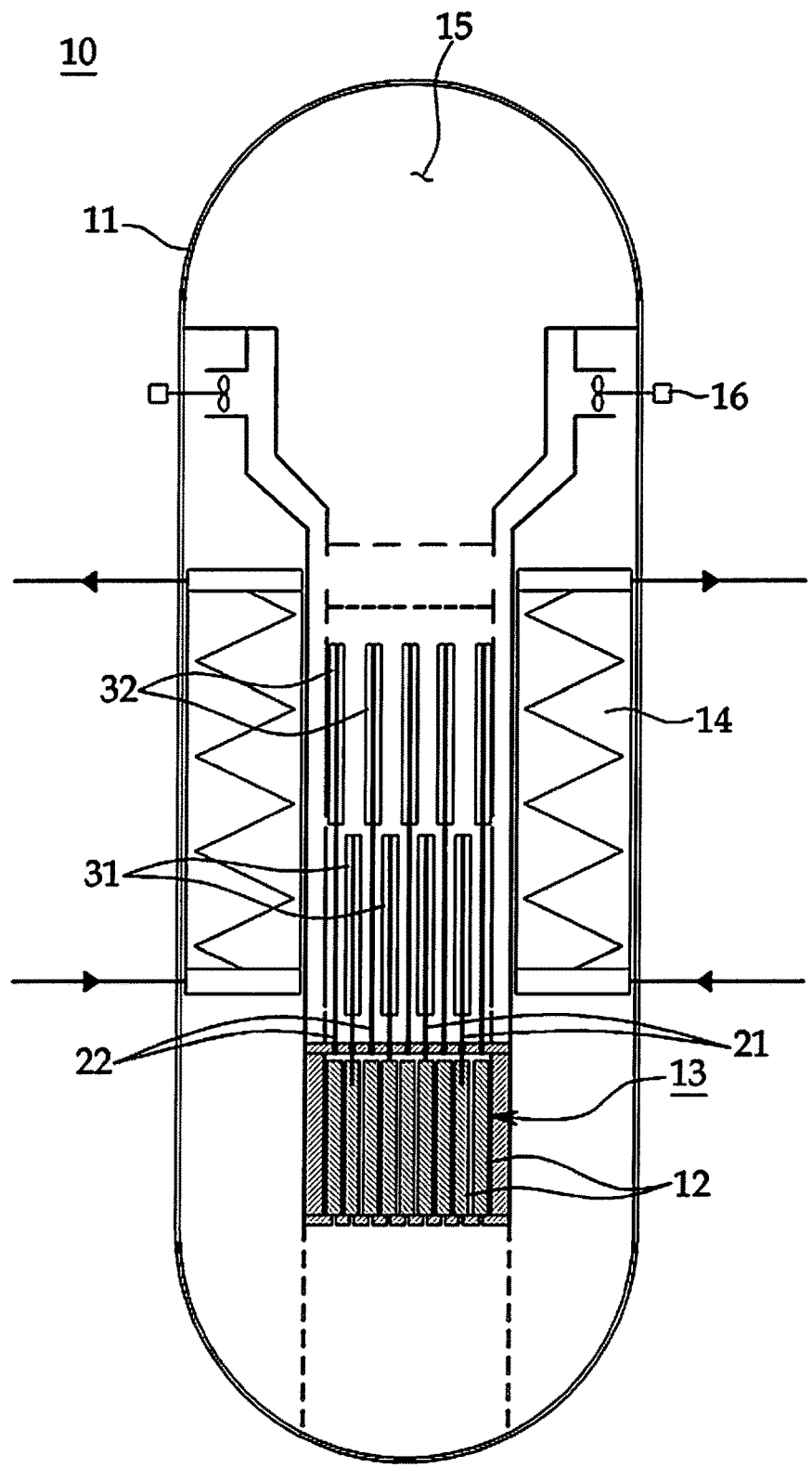
FIG. 15 is a configuration view of a nuclear reactor with an in-vessel control rod drive mechanism according to a third embodiment of the present invention.

FIG. 15 is a configuration view of a nuclear reactor with an in-vessel control rod drive mechanism according to a third embodiment of the present invention.

As illustrated in FIG. 15, in the in-vessel control rod drive mechanism according to the third embodiment of the present invention, the control rod drive mechanism for regulating 31 may be provided at the upper side of the reactor core 12 to insert or withdraw the regulating rod 21 into/from the reactor core 12 according to the operation state of the nuclear reactor 10.

The control rod drive mechanism for shutdown 32 may be provided at a higher position than the control rod drive mechanism for regulating 31 provided at the upper side of the reactor core 12 to insert or withdraw the shutdown rod 22 into/from the reactor core 12 according to the operation state of the nuclear reactor 10.

[Fourth Embodiment]

Figure 16:
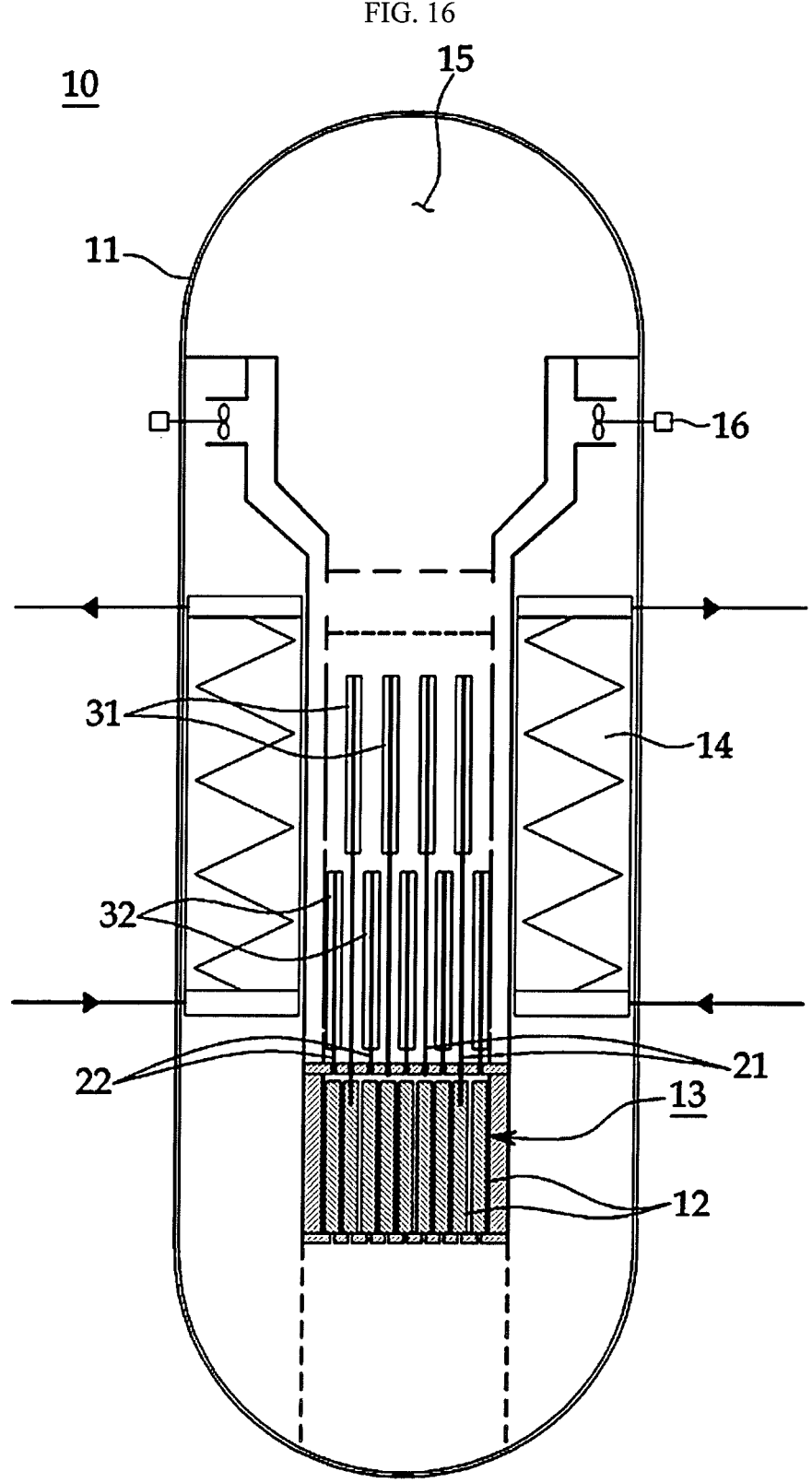
FIG. 16 is a configuration view of a nuclear reactor with an in-vessel control rod drive mechanism according to a fourth embodiment of the present invention.

FIG. 16 is a configuration view of a nuclear reactor with an in-vessel control rod drive mechanism according to a fourth embodiment of the present invention.

As illustrated in FIG. 16, in the in-vessel control rod drive mechanism according to the fourth embodiment of the present invention, the control rod drive mechanism for regulating 31 may be provided at the upper side of the reactor core 12 to insert or withdraw the regulating rod 21 into/from the reactor core 12 according to the operation state of the nuclear reactor 10.

The control rod drive mechanism for shutdown 32 may be provided between the reactor core 12 and the control rod drive mechanism for regulating 31 provided at the upper side of the reactor core 12 to insert or withdraw the shutdown rod 22 into/from the reactor core 12 according to the operation state of the nuclear reactor 10.

Meanwhile, the above-mentioned embodiments have been disclosed wherein the regulating and the shutdown rods are withdrawn to the upper side of the reactor core. However, the present invention is not limited thereto.

That is, when the in-vessel control rod drive mechanism according to embodiments of the present invention is provided at the lower side of the reactor core, the embodiments may be modified such that the control rods are withdrawn to the lower side of the reactor core.

[Fifth Embodiment]

For example, in an in-vessel control rod drive mechanism (not shown) according to a fifth embodiment of the present invention, the control rod drive mechanism for regulating 31 may be provided at the lower side of the reactor core 12 to insert or withdraw the regulating rod 21 into/from the reactor core 12 according to the operation state of the nuclear reactor 10.

The control rod drive mechanism for shutdown 32 may be provided between the reactor core 12 and the control rod drive mechanism for regulating 31 to insert or withdraw the shutdown rod 22 into/from the reactor core 12 according to the operation state of the nuclear reactor 10.

[Sixth Embodiment]

In an in-vessel control rod drive mechanism according to a sixth embodiment of the present invention, the control rod drive mechanism for regulating 31 may be provided at the lower side of the reactor core 12 to insert or withdraw the regulating rod 21 into/from the reactor core 12 according to the operation state of the nuclear reactor 10.

The control rod drive mechanism for shutdown 32 may be provided at a lower position than the control rod drive mechanism for regulating 31 provided at the lower side of the reactor core 12 to insert or withdraw the shutdown rod 22 into/from the reactor core 12 according to the operation state of the nuclear reactor 10.

As described above, in embodiments of the present invention, the control rod drive mechanism for regulating and the control rod drive mechanism for shutdown may be respectively arranged at the upper or lower side of the reactor core, or may be alternately arranged up and down at the upper or lower side of the reactor core, and thus the in-vessel control rod drive mechanism may be effectively embodied.

Although a few embodiments of the present invention have been shown and described, the present invention is not limited thereto, so it should be understood that other equivalents and modifications could be made thereto without departing from the spirit and scope of the invention.

Although the above-mentioned embodiments have been disclosed using the integral type reactor, embodiments of the present invention can be applied to the loop type reactor as well as the integral type reactor.

Embodiments of the present invention can be applied to an in-vessel control rod drive mechanism technology in which the in-vessel control rod drive mechanism is provided at the upper or lower space of the reactor core, and the loss-of-coolant accident or the rod ejection accident due to the damage of the external control rod drive mechanism can be fundamentally excluded, and thus the safety of the nuclear power plant can be enhanced.

What is claimed is:

1. A nuclear reactor comprising:
a pressure vessel;
a reactor core enclosed in the pressure vessel and comprising an array of fuel units;
a plurality of regulating control rods located inside the pressure vessel;
a regulating control rod drive module comprising a plurality of regulating control rod drive mechanisms enclosed in the pressure vessel;
each regulating control rod drive mechanism connected to a corresponding one of the plurality of regulating control rods and configured to move the corresponding regulating control rod relative to the array of fuel units along a longitudinal axis of the corresponding regulating control rod for regulating nuclear reaction at the reactor core during a normal operation of the nuclear reactor;
a plurality of shutdown control rods located inside the pressure vessel;
a shutdown control rod drive module comprising a plurality of shutdown control rod drive mechanisms enclosed in the pressure vessel; and
each shutdown control rod drive mechanism connected to a corresponding one of the plurality of shutdown control rods and configured to move the corresponding shutdown control rod relative to the array of fuel units parallel to the longitudinal axis for shutting down the nuclear reactor;
wherein the reactor core, the regulating control rod drive module and the shutdown control rod drive module are enclosed in the pressure vessel and arranged along the longitudinal axis such that the reactor core is interposed between the regulating control rod drive module and the shutdown control rod drive module,
wherein, the regulating and shutdown control rod drive mechanisms are alternately arranged such that, when viewed along the longitudinal axis, a first one of the regulating control rod drive mechanisms is generally surrounded by multiple ones of the shutdown control rod drive mechanisms and further such that, when viewed along the longitudinal axis, each of the multiple shutdown control rod drive mechanisms overlaps with the first regulating control rod drive mechanism,
wherein the nuclear reactor is an integral type reactor in which steam generators, a pressurizer, and a reactor coolant pump are provided inside the pressure vessel,
wherein when viewed along the longitudinal axis, the steam generators do not overlap with the regulating control rod drive module and the shutdown control rod drive module.

2. The nuclear reactor of claim 1, wherein the regulating control rod drive module is provided above the reactor core, and
wherein the shutdown control rod drive module is provided below the reactor core.

3. The nuclear reactor of claim 1, wherein at least one of the plurality of shutdown control rods comprises a lower portion of burnable poison rod.

4. The nuclear reactor of claim 1, wherein the regulating control rod drive module is provided below the reactor core, and
wherein the shutdown control rod drive module is provided above the reactor core.

* * * * *